(12) United States Patent
Lacher et al.

(10) Patent No.: US 10,530,824 B2
(45) Date of Patent: Jan. 7, 2020

(54) REAL-TIME END-TO-END LATENCY MONITORING

(71) Applicant: Microsoft Technology Licensing, LLC, Redmond, WA (US)

(72) Inventors: Michael Lacher, Redmond, WA (US); Hadden Hoppert, Bellevue, WA (US); Gabriel Young, Belevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 547 days.

(21) Appl. No.: 14/866,701

(22) Filed: Sep. 25, 2015

(65) Prior Publication Data
US 2017/0093674 A1 Mar. 30, 2017

(51) Int. Cl.
*H04L 12/825* (2013.01)
*H04L 29/06* (2006.01)
*H04L 12/801* (2013.01)

(52) U.S. Cl.
CPC ........... *H04L 65/601* (2013.01); *H04L 47/18* (2013.01)

(58) Field of Classification Search
CPC ........ H04L 47/25; H04L 47/283; H04L 67/32
USPC .......................................... 709/233; 370/235
See application file for complete search history.

(56) References Cited

U.S. PATENT DOCUMENTS

| | | | |
|---|---|---|---|
| 7,461,163 B2 | 12/2008 | Kryskow, Jr. et al. | |
| 7,685,270 B1 | 3/2010 | Vermeulen et al. | |
| 8,792,347 B2 | 7/2014 | Swenson et al. | |
| 2003/0055883 A1* | 3/2003 | Wiles, Jr. ............ | G06F 11/3414 709/203 |
| 2010/0205138 A1* | 8/2010 | Zhang ...................... | G06N 7/02 706/52 |
| 2011/0029664 A1* | 2/2011 | Harrang ................ | H04L 1/0002 709/224 |
| 2013/0166681 A1 | 6/2013 | Thompson et al. | |
| 2014/0189091 A1* | 7/2014 | Tamasi ................ | H04L 43/0858 709/224 |
| 2014/0274370 A1 | 9/2014 | Shah | |

FOREIGN PATENT DOCUMENTS

| | | |
|---|---|---|
| EP | 2716337 A2 | 4/2014 |
| WO | 2013084078 A1 | 6/2013 |

OTHER PUBLICATIONS

Kamarainen et al., "Towards Persuasive and Mobile Gaming with Distributed Cloud Infrastructure", Dec. 4-5, 2014.*
Spracklen, et al., "Comprehensive User Experience Monitoring", In Vmware Technical Journal, Spring, 2012, 35 pages.
(Continued)

*Primary Examiner* — Douglas B Blair
*Assistant Examiner* — Jonathan A Sparks
(74) *Attorney, Agent, or Firm* — Arent Fox LLP

(57) ABSTRACT

In one example, a streaming server or a client device may measure an end-to-end time for a streaming operation in real time. The streaming server may store an input time associated with a user input and a frame presentation time associated with the frame output. The streaming server automatically may correlate the user input to the frame output generated at the streaming server in a frame generation process. The streaming server may calculate an end-to-end time based on the input time and the frame presentation time. The streaming server may adjust the frame generation process based on the end-to-end time.

20 Claims, 12 Drawing Sheets

(56) References Cited

OTHER PUBLICATIONS

Chen, et al., "Measuring the Latency of Cloud Gaming Systems", In Proceedings of the 19th ACM International Conference on Multimedia, Nov. 28, 2011, pp. 1269-1272.
Chen, et al., "Using End-User Latency to Manage Internet Infrastructure", In Proceedings of the Second Workshop on Industrial Experiences with Systems Software, Dec. 8, 2002, 16 pages.
Wen, et al., "QoE-Driven Performance Analysis of Cloud Gaming Services", In Proceedings of IEEE 16th International Workshop on Multimedia Signal Processing, Sep. 22, 2014, 6 pages.
Rhee, et al., "Implementation of the Cloud Gaming Platform with Adaptive Bitrate Streaming", In Proceedings of International Conference on Information and Communication Technology Convergence, Oct. 22, 2014, pp. 478-479.
"Latency—The Impact of Latency on Application Performance", Nokia Siemens Networks, Retrieved on: Jul. 15, 2015, 15 pages.
Song, et al., "Real-time End-to-end Network Monitoring in Large Distributed Systems", In Proceedings of 2nd International Conference on Communication Systems Software and Middleware, Jan. 7, 2007, 10 pages.

* cited by examiner

500
Figure 5

| SERVER ID 510 | CLIENT ID 520 | INPUT ID 530 | INPUT DATA 540 | INPUT TIME 550 |

600
Figure 6

| CLIENT ID 610 | SERVER ID 620 | INPUT ID 630 | FRAME ID 640 | FRAME DATA 650 |

700
Figure 7

| SERVER ID 710 | CLIENT ID 720 | INPUT ID 730 | FRAME ID 740 | CLIENT TRX TIME 750 | CLIENT RX TIME 760 | FRAME PRESENTATION TIME 770 | LATENCY LOG 780 |

| |
|---|
| CLIENT ID 802 |
| SERVER ID 804 |
| INPUT ID 806 |
| INPUT TIME 808 |
| ADDITIONAL INPUT ID 810 |
| ADDITIONAL INPUT TIME 812 |
| FRAME ID 814 |
| FRAME PRESENTATION TIME 816 |
| END-TO-END TIME 818 |
| ADDITIONAL END-TO-END TIME 820 |
| AGGREGATE END-TO-END TIME 822 |
| CLIENT INPUT PROCESSING TIME 824 |
| UPSTREAM TRANSMISSION TIME 826 |
| FRAME GENERATION TIME 828 |
| DOWNSTREAM TRANSMISSION TIME 830 |
| CLIENT FRAME PROCESSING TIME 832 |

REAL-TIME END-TO-END LATENCY MONITORING

BACKGROUND

A user device may connect to a streaming server to interact with a network service, such as a multiple user online game. The streaming server may generate content based on a user input. The user may provide an input to a client device, which may then be forwarded to the streaming server across a data network. For example, a user streaming a game may press a button on a client input device to make an avatar in the game jump. The client device may forward the user input to a gaming service.

The streaming server may then send media content, such as video or audio content, back across the data network for presentation to the user. The client device may present the media content as a series of discrete frames. In the previous example, the gaming service may send a series of discrete frame showing the avatar jumping.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to measuring an end-to-end time for a streaming operation in real time. A streaming server may store an input time associated with a user input and a frame presentation time associated with the frame output. The streaming server automatically may correlate the user input to the frame output generated at the streaming server in a frame generation process. The streaming server may calculate an end-to-end time based on the input time and the frame presentation time. The streaming server may adjust the frame generation process based on the end-to-end time.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 5 illustrates, in a block diagram, one example of an input packet.

FIG. 6 illustrates, in a block diagram, one example of a frame packet.

FIG. 7 illustrates, in a block diagram, one example of a display report.

FIG. 8 illustrates, in a block diagram, one example of a latency log.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a streaming server, a client device, a computing device, or a machine-implemented method.

An end-to-end time for a streaming operation describes the time from the entry of a user input to the display of the frame resulting from the user input. Previously, to measure the end-to-end time for the streaming operation, a user would enter a user input at a client device. The user would then identify when the client device displays the reaction to the user input. The variability of which frame resulted from the user input may prevent the client device or a streaming server executing the streaming operation from automatically calculating an end-to-end time for the streaming operation. By using a probability calculation, the streaming server may automatically correlate the user input to the frame output. The streaming server or the client device may then connect an input time identifying when the user input was received with a frame presentation time identifying when the frame output was displayed to the user in order to calculate the end-to-end time.

In one example, a streaming server or a client device may measure an end-to-end time for a streaming operation in real time by correlating a user input to a frame output. The streaming server may store an input time associated with a user input and a frame presentation time associated with the frame output. The streaming server automatically may correlate the user input to the frame output generated at by the streaming server in a frame generation process. The same server may perform the correlation and the frame generation process, or these activities may be distributed across multiple servers. The streaming server may calculate an end-to-end time based on the input time and the frame presentation time. The streaming server may adjust the frame generation process based on the end-to-end time.

The client device may store an input time associated with a user input and a frame presentation time associated with a frame output generated at a streaming server in a frame generation process. The client device may receive the frame output from the streaming server. The client device may identify a correlation by the streaming server of the frame output to the user input. The client device may calculate an end-to-end time based on the input time and the frame presentation time to the user. The client device may present the end-to-end time to a user.

Figure 1:
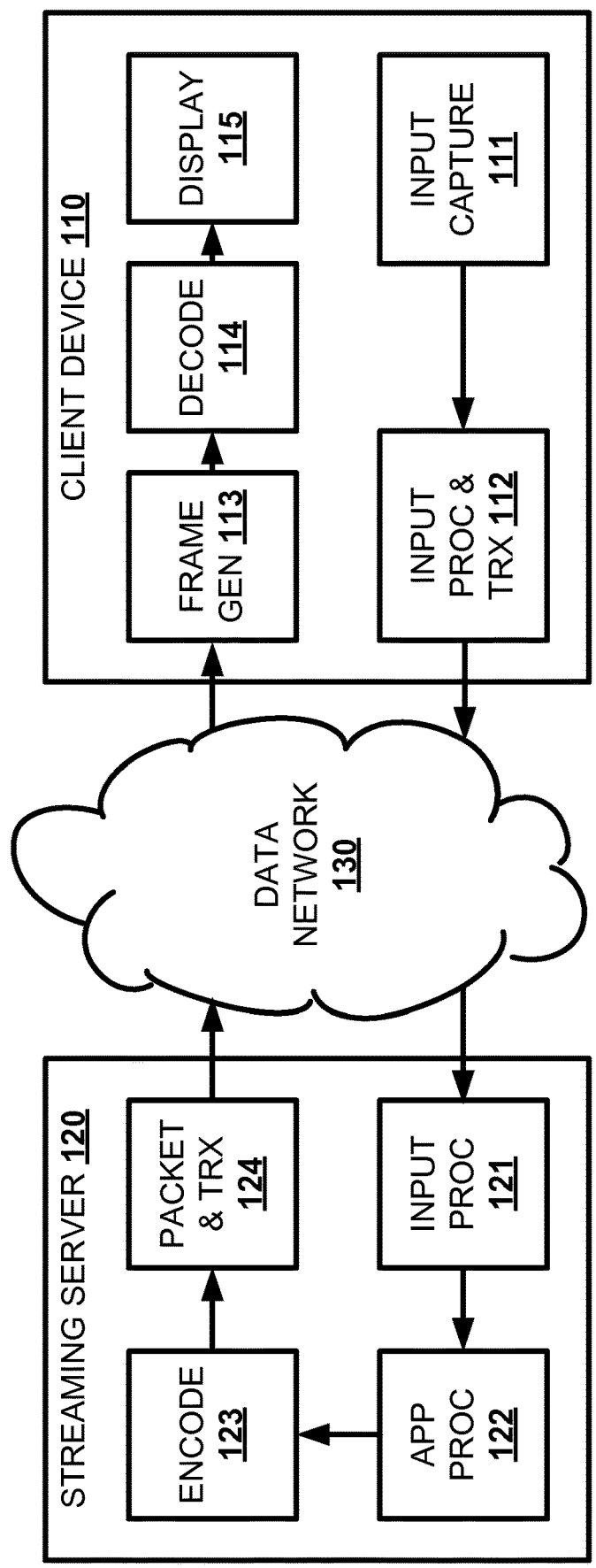
FIG. 1 illustrates, in a block diagram, one example of a streaming network.

FIG. 1 illustrates, in a block diagram, one example of a streaming network 100. A user may use a client device 110 to access a streaming server 120, such as a multi-user interactive gaming service, via a data network connection 130. The client device 110 may be a personal computer, a laptop, a tablet, a mobile phone, a game console, a smart watch, or other computing device used by the user to access the streaming server. The streaming server 120 may be implemented on a single server or a distributed set of servers, such as a server farm. The data network connection 130 may be an internet connection, a wide area network connection, a local area network connection, or other type of data network connections. The client device 110 may use a general use application or a dedicated streaming application, such as a gaming application, to access the streaming server 120.

The client device 110 may implement an input capture digitizer 111 that creates a data representation of an input provided by the user via an input device. The client device 110 may implement an input processing and transmission module 112 to process the input data and to convert the input data into a format for transmission across the data network 130. The client device 110 may then transmit the input data across the data network 130 to the streaming server 120.

The streaming server 120 may receive the input data transmission in an input processing module 121 to convert the input data into a format for processing by an application processing module 122, such as a game processing module. The application processing module 122 may use the input data to generate media data, such as audio or video data, for presentation to the user on the client device 110. The streaming server 120 may implement an encoding module 123 that encodes the media data for transmission. The streaming server 120 may implement a packetization and transmission module 124 to format the media data into media packets for transmission across the data network 130 to the client device 110.

The client device 110 may receive the media packets in a frame generation module 113. The frame generation module 113 may restore a media frame from the media packet. The client device 110 may implement a decoding module 114 to decode the media frame for presentation to the user. The client device 110 may implement a display driver 115 to display the media frame to the user.

The display driver 115, the application processing module 122, and the input capture digitizer 111 may each introduce native latency into the operation of the application. The native latency is latency that is present whether the application is operated on a single device or is operated across multiple devices. The other modules may each introduce an additional network based latency. The network based latency results from distributing the operation across multiple devices on a network. The network based latency may be inherent to the vagaries of the network or may be the result of network adjacent operations, such as encoding, decoding, and packetization.

Figure 2:
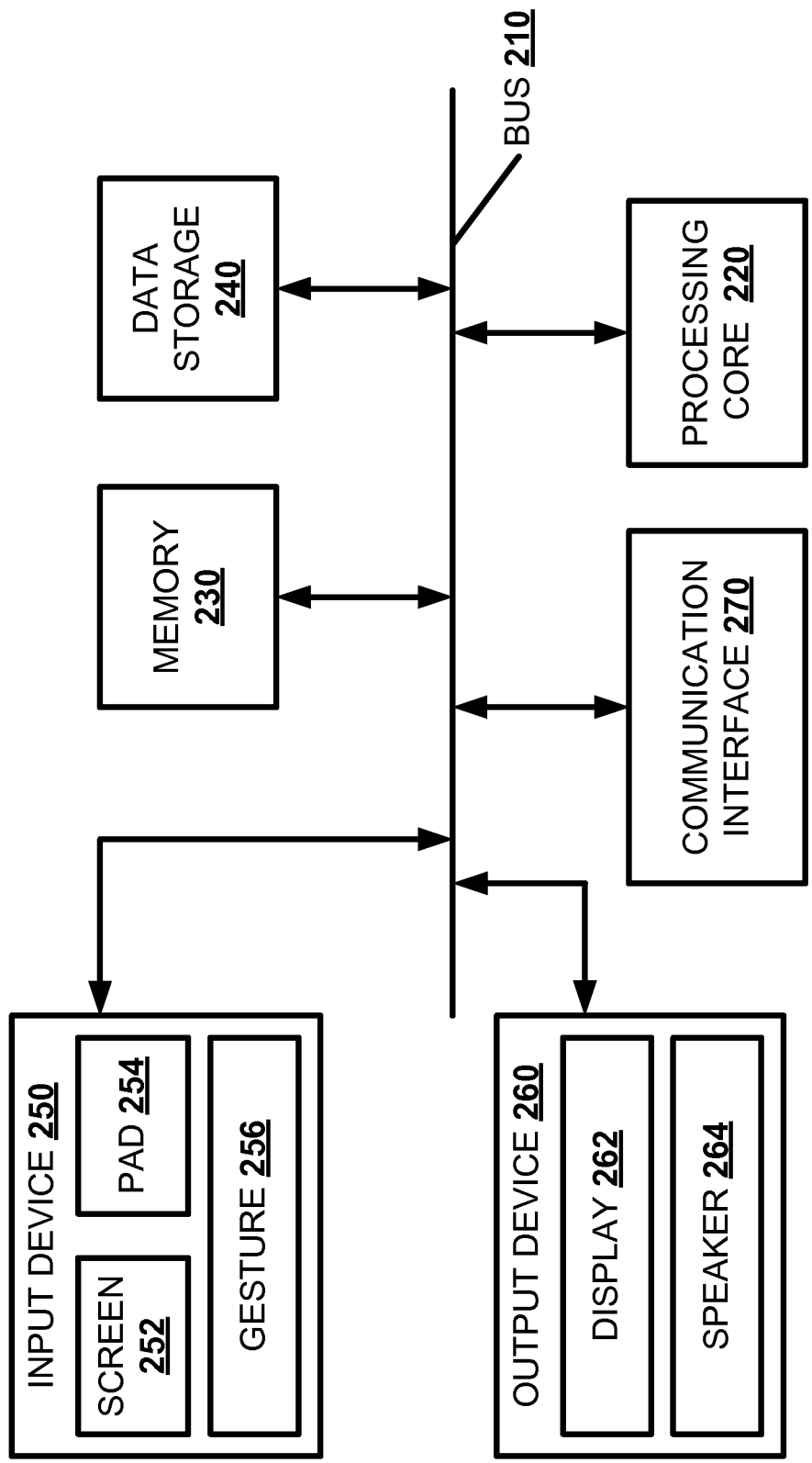
FIG. 2 illustrates, in a block diagram, one example of a computing device.

FIG. 2 illustrates a block diagram of an exemplary computing device 200 which may act as a streaming server that operates a streaming server or a client device. The computing device 200 may combine one or more of hardware, software, firmware, and system-on-a-chip technology to implement a streaming server that operates a streaming server or a client device. The computing device 200 may include a bus 210, a processor 220, a memory 230, a data storage 240, an input device 250, an output device 260, and a communication interface 270. The bus 210, or other component interconnection, may permit communication among the components of the computing device 200.

The processor 220 may include at least one conventional processor or microprocessor that interprets and executes a set of instructions. The processing core 220 may be configured to automatically correlate the user input to the frame output generated at the streaming server in a frame generation process. The processing core 220 may specify a causal frame number indicating a frame quantity immediately after the user input to disregard as being causal. The processing core 220 may choose a different causal frame number based on a latency accuracy of the end-to-end time, as determined by user feedback. The processing core 220 may calculate an end-to-end time based on the input time and the frame presentation time.

The processing core 220 may adjust the frame generation process based on the end-to-end time. On the streaming server side, the processing core 220 may increase or decrease an encoding complexity for the frame generation process based on the end-to-end time to a user. For example, the processing core 220 may adjust the frame generation process by adjusting a refresh rate for the frames based on the end-to-end time. Alternately, the processing core 220 may adjust the frame generation process by adjusting a rendering complexity for a frame, reducing or increasing resolution. On the client device side, the processing core 220 may reroute to an alternate streaming server based on the end-to-end time to a user.

The processing core 220 may generate a latency log storing an input identifier, the input time, a frame identifier, the frame presentation time, and the end-to-end time. The processing core 220 may calculate a client input processing time based on the input time identifying when the user input is received and a client transmission time identifying when the user input is transmitted from the client device. The processing core 220 may calculate an upstream transmission time based on a server reception time identifying when the user input is received and the client transmission time. The processing core 220 may calculate a server frame generation time based on a server reception time and a server transmission time identifying when the fame output is transmitted from the streaming server. The processing core 220 may calculate a downstream transmission time based on a server transmission time and a client reception time identifying when a frame output is received by the client device. The processing core 220 may calculate a client frame processing time based on the frame presentation time identifying when the frame is presented to the user and the client reception time.

The processing core 220 may identify an additional input time for an additional user input. The processing core 220 automatically may correlate the additional user input to the frame output generated at the streaming server in the frame generation process. The processing core 220 may calculate an additional end-to-end time based on the additional input time and the frame presentation time. The processing core 220 may express an aggregate input end-to-end time as at least one of a minimum end-to-end time, a maximum end-to-end time, or an average end-to-end time over multiple user inputs.

The memory 230 may be a random access memory (RAM) or another type of dynamic data storage that stores information and instructions for execution by the processor 220. The memory 230 may also store temporary variables or other intermediate information used during execution of instructions by the processor 220. The memory 230 may be configured to store an input time associated with a user input and a frame presentation time associated with a frame output. The memory 230 may record a server reception time upon receiving the user input. The memory 230 may record a server transmission time upon sending the frame output from the streaming server to a client device. The memory 230 may record a server reception time upon receiving the user input.

The data storage 240 may include a conventional ROM device or another type of static data storage that stores static information and instructions for the processor 220. Data user for calculation may be stored in the memory 230 at runtime or in the persistent data storage 240 for offline processing. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing a latency log.

In a client device, the input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The output device 260 may include one or more conventional mechanisms that output information to the user, including a display screen 262, a printer, one or more speakers 264, a headset, a vibrator, or a medium, such as a memory, or a magnetic or optical disk and a corresponding disk drive.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. In a streaming server, the communication interface 270 may send the end-to-end time to a client device for presentation to a user. The communication interface 270 may receive an input identifier and the input time from a client device. The communication interface 270 may send a frame identifier for the frame output to a client device to identify the frame presentation time for the frame output. The communication interface 270 may receive a client transmission time from a client device identifying when the user input is transmitted from the client device to the streaming server. The communication interface 270 may receive from a client device a client reception time identifying when a frame output is received by the client device from the streaming server.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 270.

Figure 3:
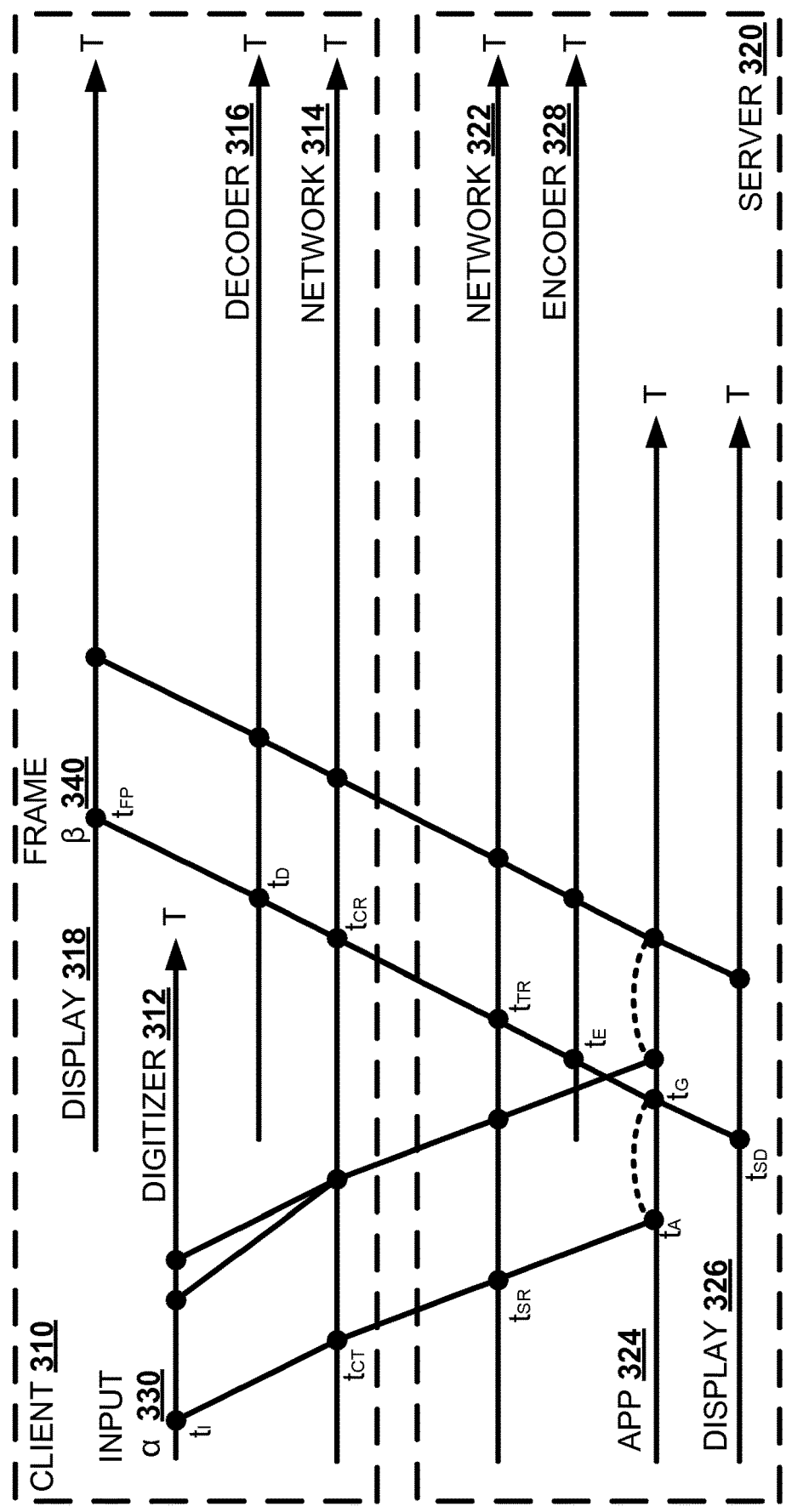
FIG. 3 illustrates, in a timing diagram, one example of a streaming interaction.

FIG. 3 illustrates, in a timing diagram, one example of a streaming interaction 300 as a function of time T. A client device 310 may use a streaming server 320 to use an input α 330 to generate a frame β 340. The client device 310 may receive one or more inputs 330 at the input capture digitizer 312 at an input time $t_I$. The client device 310 may use a client network interface 314 to transmit an input packet at a client transmission time $t_{CT}$.

The streaming server 320 may receive the input packet in a server network interface 322 at a server reception time $t_{SR}$. The server network interface 322 may pass the input data from the input packet to an application 324 for processing at an application reception time $t_A$. The application 324 may generate a media frame to be shown to the user, previewing the media frame in a server display 326 at server display time $t_{SD}$. The application may pass the media frame to an encoder 328 of the streaming server 320 at frame generation time $t_G$. The encoder 328 may encode the data at encoding time $t_E$ before sending the encoded packet to the server network interface 322. The server network interface 322 may transmit the encoded packet back across the data network at a server transmission time $t_{TR}$.

The client network interface 314 may receive the encoded packet at client reception time $t_{CR}$. A decoder 316 may decode the encoded packet to generate a media frame to present to the user at decoding time $t_D$. A client display 318 may present the media frame to the user at frame presentation time $t_{FP}$. The client device 310 and the streaming server 320 may record each of these times to calculate and analyze various latencies in the overall process. To more efficiently analyze the process, the streaming server may correlate the user input received at application reception time $t_A$ with a frame output generated at frame generation time $t_G$ to make a real-time end-to-end determination of the overall timing.

Figure 4:
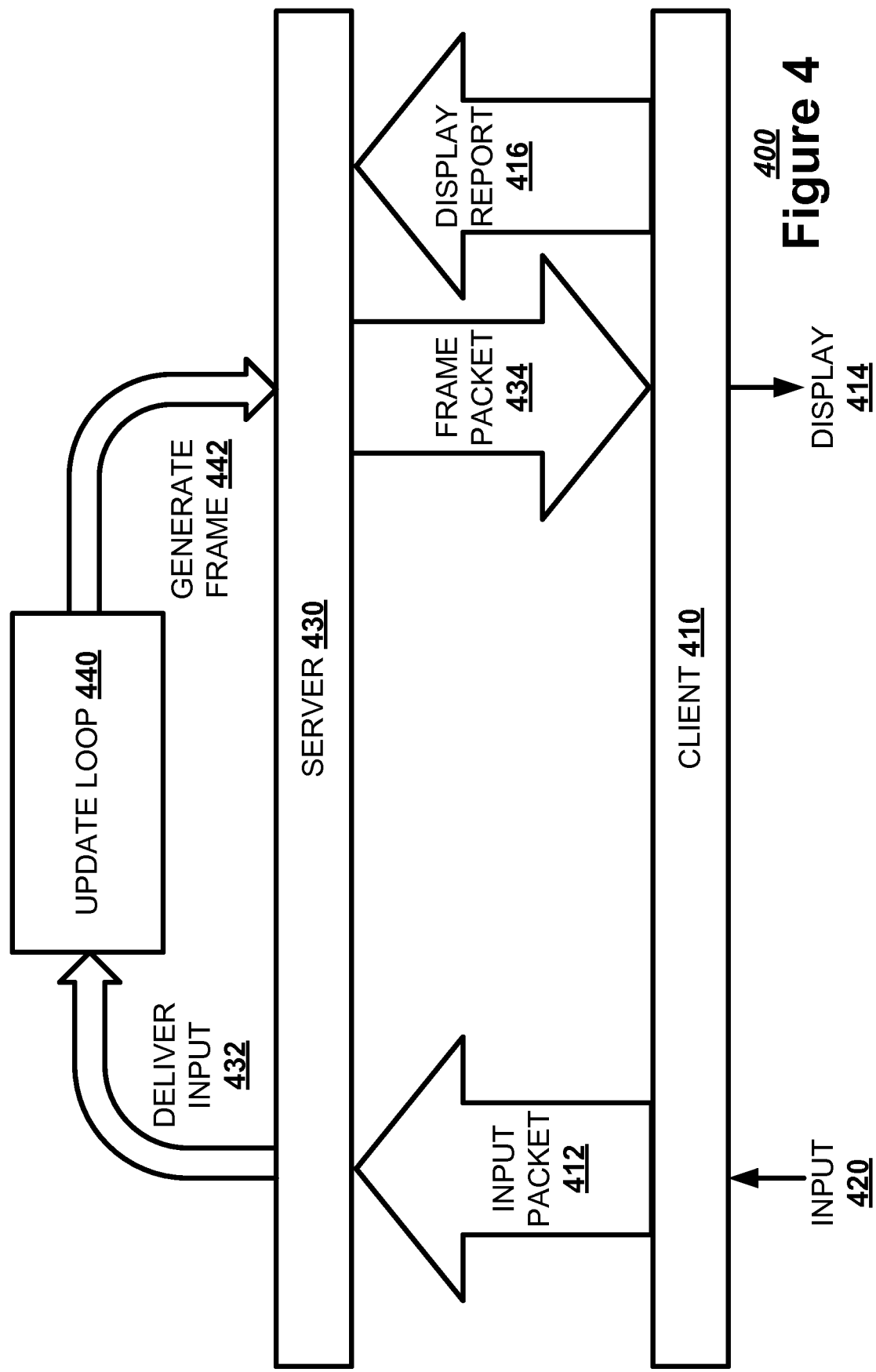
FIG. 4 illustrates, in a block diagram, one example of a streaming server architecture.

FIG. 4 illustrates, in a block diagram, one example of a streaming server architecture 400. The client device 410 may receive a user input 420 from a user. The client device 410 may generate an input packet 412 having an input identifier identifying the user input, input data describing the user input, and an input time representing the time that the user input was captured. The client device 410 may send the input packet 412 to the streaming server 430. The streaming server 430 may deliver 432 the user input to an update loop 440 to create an updated frame. The update loop 440 may use the input packet 412 to generate 442 a frame represented by a frame identifier for presentation to the user. The streaming server 430 may correlate the input identifier to the frame identifier, indicating that the frame is a result of the user input.

The streaming server 430 may generate a frame packet 434 having a frame identifier and frame data describing a media frame for presentation to a user. The client device 410 may display 414 the media frame to the user. The client device 410 may record the frame presentation time that the media frame is displayed to the user. The client device 410 may generate a display report 416 having a frame acknowledgement indicating that the frame has been received, the frame identifier, and the frame presentation time. Based on the correlation between the input identifier and the frame identifier, the streaming server 430 or the client device 410 may calculate the end-to-end time to determine the latency covering from entry of the user input to presentation of the frame.

FIG. 5 illustrates, in a block diagram, one example of an input packet 500. The input packet 500 may have a server identifier 510 indicating the streaming server that is the target of the input packet 500. The input packet 500 may have a client device identifier 520 indicating the client device sending the input packet 500. The input packet 500 may have an input identifier 530 referencing the user input. The input packet 500 may have an input data set 540 describing the content of the user input. The input packet 500 may have an input time 550 indicating the time that a user input is captured by the client device.

FIG. 6 illustrates, in a block diagram, one example of a frame packet 600. The frame packet 600 may have a client device identifier 610 indicating the client device that is the target of the frame packet 600. The frame packet 600 may have a streaming server identifier 620 indicating the streaming server sending the frame packet 600. The frame packet 600 may have an input identifier 630 referencing the user input that the streaming server has correlated to the media frame so that the client device may produce a latency log describing any resulting latency timing. The frame packet 600 may have a frame identifier 640 referencing the media frame that the client device is to present. The frame packet 600 may have a frame data set 650 describing the content of the media frame.

FIG. 7 illustrates, in a block diagram, one example of a display report 700. The display report 700 may have a server identifier 710 indicating the streaming server that is the target of the display report 700. The display report 700 may have a client device identifier 720 indicating the client device sending the display report 700. The display report 700 may have an input identifier 730 referencing the user input used to calculate the latency log. The display report 700 may have a frame identifier 740 referencing the media frame that the client device presented. The input packet 700 may have a client transmission (TRX) time 750 indicating the time the input packet is sent from the client device. The display report 700 may have a client reception (RX) time 760 indicating the time the frame packet is received by the client device. The display report 700 may have a frame presentation time 770 indicating the time the frame output is presented to the user. If a latency log is generated at the client device, the display report 700 may have a latency log 780 describing operation latency to varying degrees of granularity.

FIG. 8 illustrates, in a block diagram, one example of a latency log 800. The latency log 800 may have a client device identifier 802 indicating the client device capturing the user input. The latency log 800 may have a streaming server identifier 804 indicating the streaming server generating the frame output. The latency log 800 may have an input identifier 806 referencing the user input that has caused the streaming server to generate a frame output. The latency log 800 may have an input time 808 describing the time that the user input was captured by the client device. The latency log 800 may have one or more additional input identifiers 810 referencing one or more additional user inputs that have also contributed to the frame output generated by the streaming server. The latency log 800 may have one or more additional input times 812 describing each time that each additional user input was captured by the client device. The latency log 800 may have a frame identifier 814 referencing the frame output sent to the client device for presentation to the user. The latency log 800 may have a frame presentation time 816 describing the time that the frame output was presented by the client device to the user.

To generate the latency log 800, the client device or the streaming server may calculate a number of timing metrics to measure operational performance of the streaming server. The latency log 800 may have an end-to-end time 818 based on subtracting the input time 808 from the frame presentation time 816. The end-to-end time 818 represents the length of time for a streaming operation from the capture of a user input to presentation of the frame output. The latency log 800 may have one or more additional end-to-end times 820 based on subtracting an additional input time 812 from the frame presentation time 816. The additional end-to-end time 820 represents the length of time for a streaming operation from the capture of an additional user input to presentation of the frame output. The latency log 800 may have an aggregate input end-to-end time 822 representing the length of time for a streaming operation generated from multiple inputs. The aggregate input end-to-end time 822 may be based on a minimum end-to-end time, a maximum end-to-end time, or an average end-to-end time for each contributing user input. A contributing user input is a user input that the streaming server uses in generation of the frame output.

The client device or the streaming server may further calculate a number of additional timing metrics to measure component aspects of the operational performance of the streaming server. The latency log 800 may have a client input processing time 824 based on subtracting the input time 808 from the client transmission time. The client input processing time 824 represents the length of time for the client device to process a user input for transmission to the streaming server. The latency log 800 may have an upstream transmission time 826 based on subtracting the client transmission time from the server reception time. The upstream transmission time 826 represents the length of time for the data network to transfer a data packet from the client device to the streaming server. The latency log 800 may have a server frame generation time 828 based on subtracting the server reception time from the server transmission time. The server frame generation time 828 represents the length of time for the streaming server to generate a frame output for transmission upon receiving the user input. The latency log 800 may have a downstream transmission time 830 based on subtracting the server transmission time from the client reception time. The downstream transmission time 830 represents the length of time for the data network to transfer a data packet from the streaming server to the client device. The latency log 800 may have a client frame processing time 832 based on subtracting the client reception time from the frame presentation time 816. The client frame processing time 832 represents the length of time for the client device to present the frame output to the user upon receiving the frame output from the data network.

Figure 9:
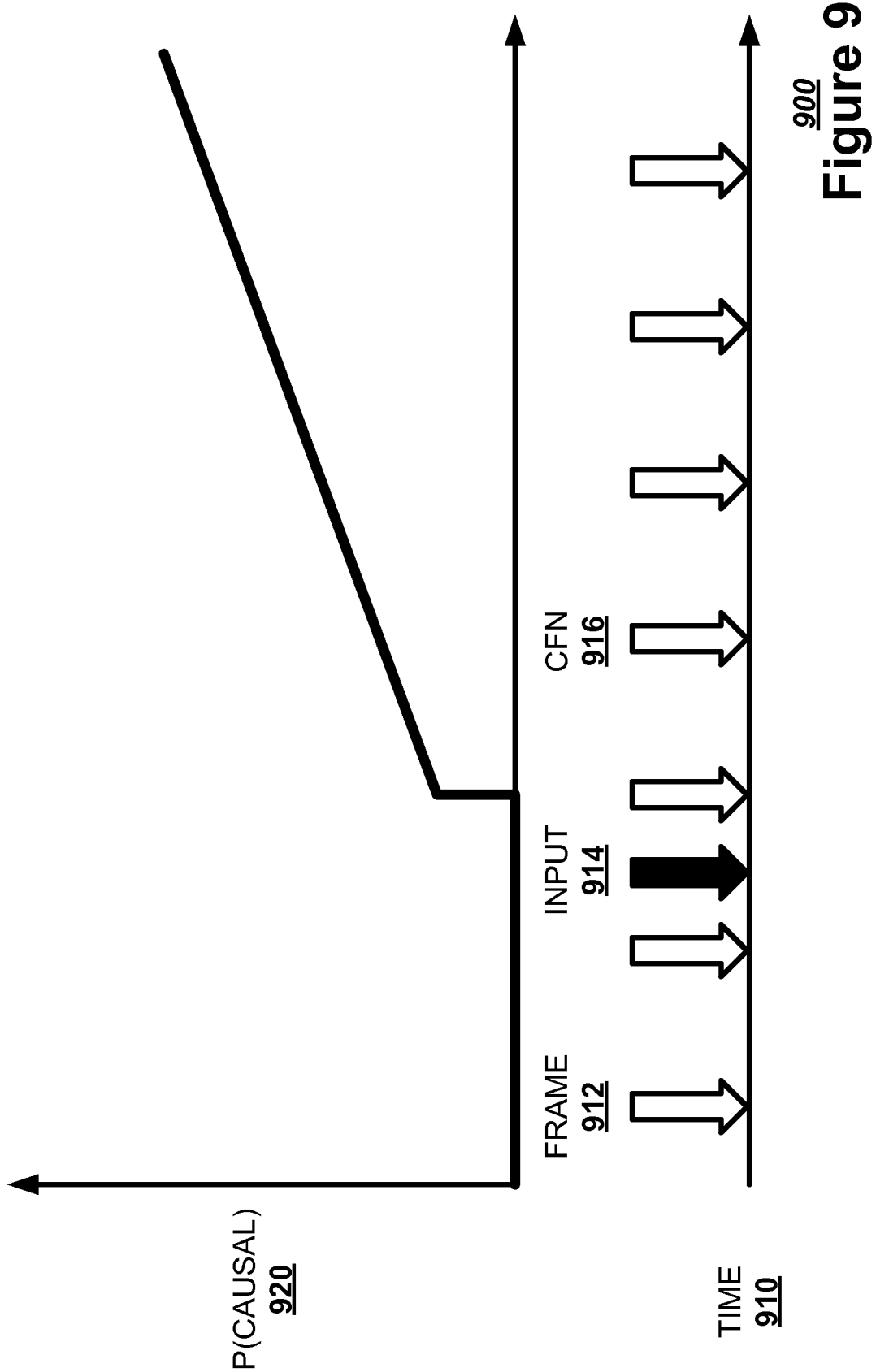
FIG. 9 illustrates, in a timing diagram, one example of an input-frame correlation.

FIG. 9 illustrates, in a timing diagram, one example of an input-frame correlation 900. During a given timeline 910, an output device of the client device, such as a display, may present a series of frames 912 at a regular interval as provided by a streaming server. The client device may receive a user input 914 in an input device of the client device, such as a touch screen or a gesture capture device. The user input 914 may cause the streaming server to generate a frame 912 based on the user input 914. The probability 920 that a frame 912 was caused by a user input 914 may increase the longer the time after the user input 914. The streaming server may calculate the probability 920 that a user input is causal for a given frame based on previous time trials. The streaming server may factor into the probability calculation different generation factors, such as process type and server form factor. When the probability 920 for a frame 912 exceeds a causal threshold, the streaming server may correlate that frame 912 to the user input 914. To more efficiently select a correlating output frame, the streaming server may specify a causal frame number 916 indicating a frame quantity immediately after the user input to disregard as being causal. The streaming server may adjust the causal frame number 916 based on a process type of the frame generation process, such as interactive video or online gaming.

Figure 10:
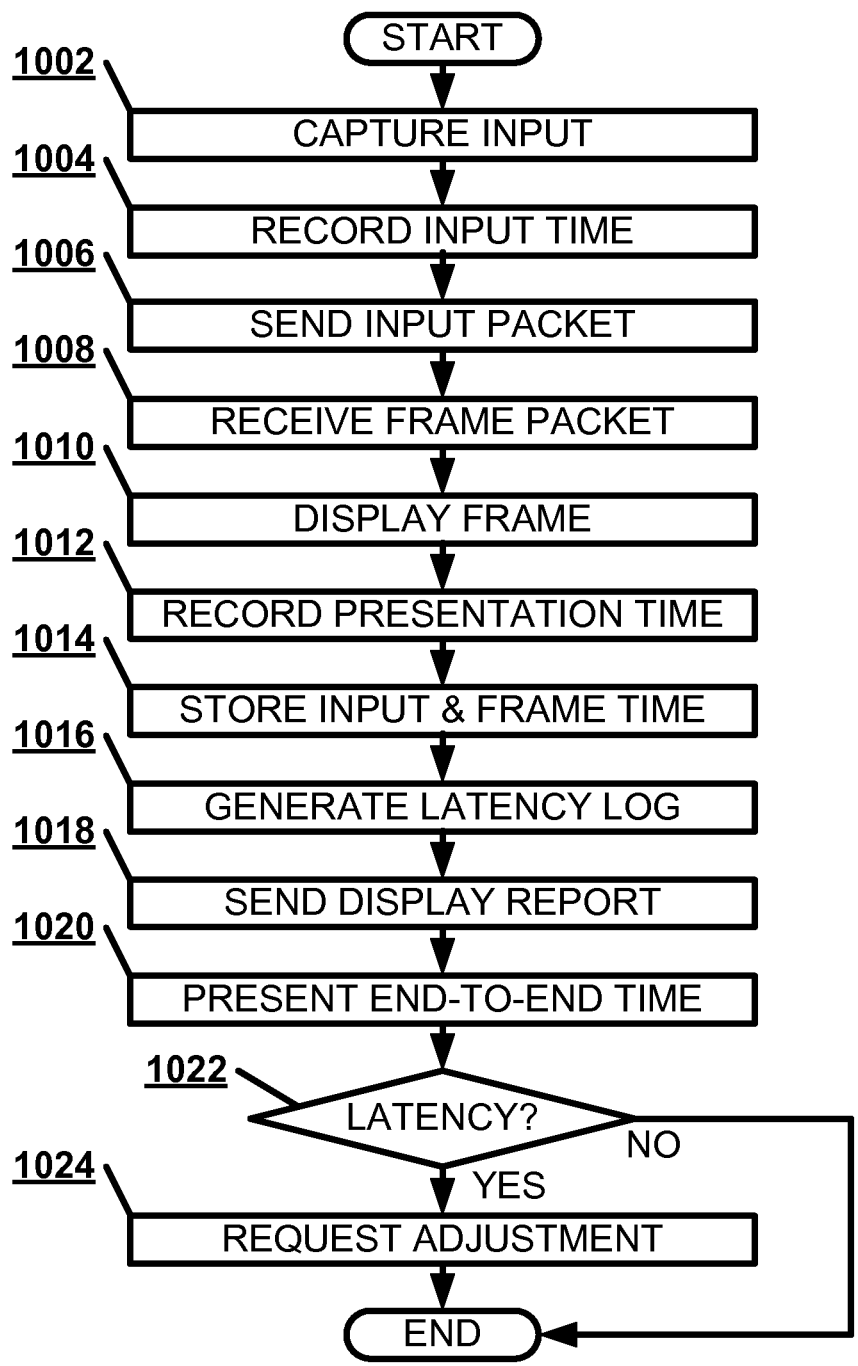
FIG. 10 illustrates, in a flowchart, one example of a method of sending a latency log from a client device.

FIG. 10 illustrates, in a flowchart, one example of a method 1000 of sending a latency log from a client device. The client device may capture a user input from a user (Block 1002). The client device may record the input time for the user input (Block 1004). The client device may send an input packet having the input identifier, the user input, and the input time to the streaming server (Block 1006). The client device may receive from the streaming server a frame packet having a frame output automatically correlated to the user input at the streaming server and a frame identifier for the frame output to identify the frame presentation time for the frame output (Block 1008). The client device may display the frame output to the user (Block 1010). The client device may record a frame presentation time for the frame output (Block 1012). The client device may store the input time associated with the user input and the frame representation time associate with frame output generated at a streaming server in the frame generation process (Block 1014).

The client device may generate a latency log storing at least one of the input identifier, the input time, the frame identifier, the frame presentation time, and the end-to-end time (Block 1016). The client device may send a display report having at least one of the frame presentation time and the latency log to the streaming server (Block 1018). The client device may present the end-to-end time to the user (Block 1020). If the latency of the streaming operation is greater than a latency threshold (Block 1022), the client device may request an adjustment to the frame generation process based on the end-to-end time (Block 1024).

Figure 11:
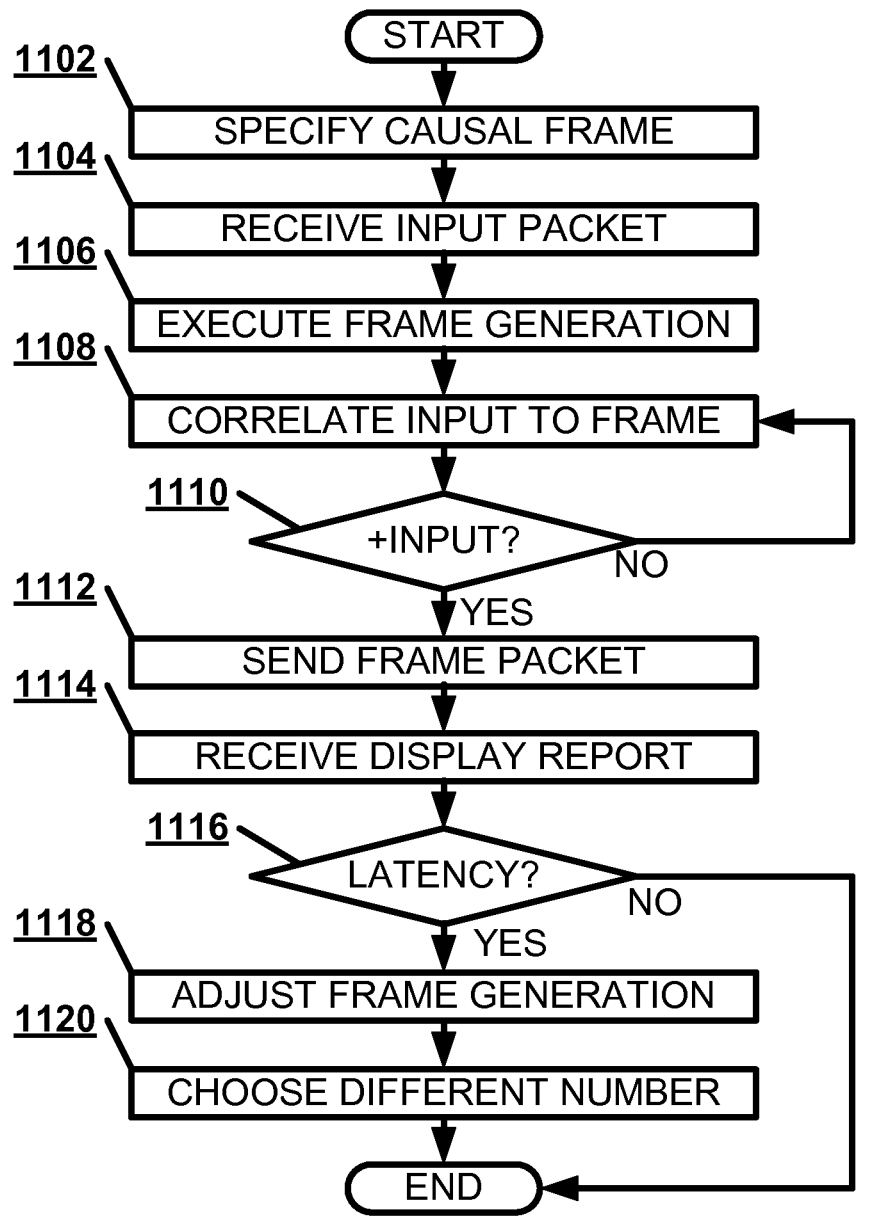
FIG. 11 illustrates, in a flowchart, one example of a method of receiving a latency log in a streaming server.

FIG. 11 illustrates, in a flowchart, one example of a method 1100 of receiving a latency log in a streaming server. The streaming server may specify a causal frame number indicating a frame quantity immediately after the user input to disregard as being causal (Block 1102). The streaming server may receive an input packet having a user input, an input identifier for the user input, and an input time for the user input from a client device (Block 1104). The streaming server may execute a frame generation process to generate a frame output based on the user input (Block 1106). The streaming server may automatically correlating the user input to the frame output generated in a frame generation process (Block 1108). If the streaming server identifies an additional user input related to the frame output (Block 1110), the streaming server may automatically correlate the additional user input to the frame output (Block 1108).

The streaming server may send to the client device a frame packet having the correlated user input identifiers, a frame output, and a frame identifier for the frame output to identify the frame presentation time for the frame output (Block 1112). The streaming server may receive from the client device a display report having an input identifier for the user input, a frame identifier for the frame output, a frame presentation time for the frame output, and a latency log (Block 1114). If the latency of the streaming operation is greater than a latency threshold (Block 1116), the streaming server may adjust the frame generation process based on the end-to-end time (Block 1118). The streaming server may choose a different causal frame number based on a latency accuracy of the end-to-end time (Block 1120).

Figure 12:
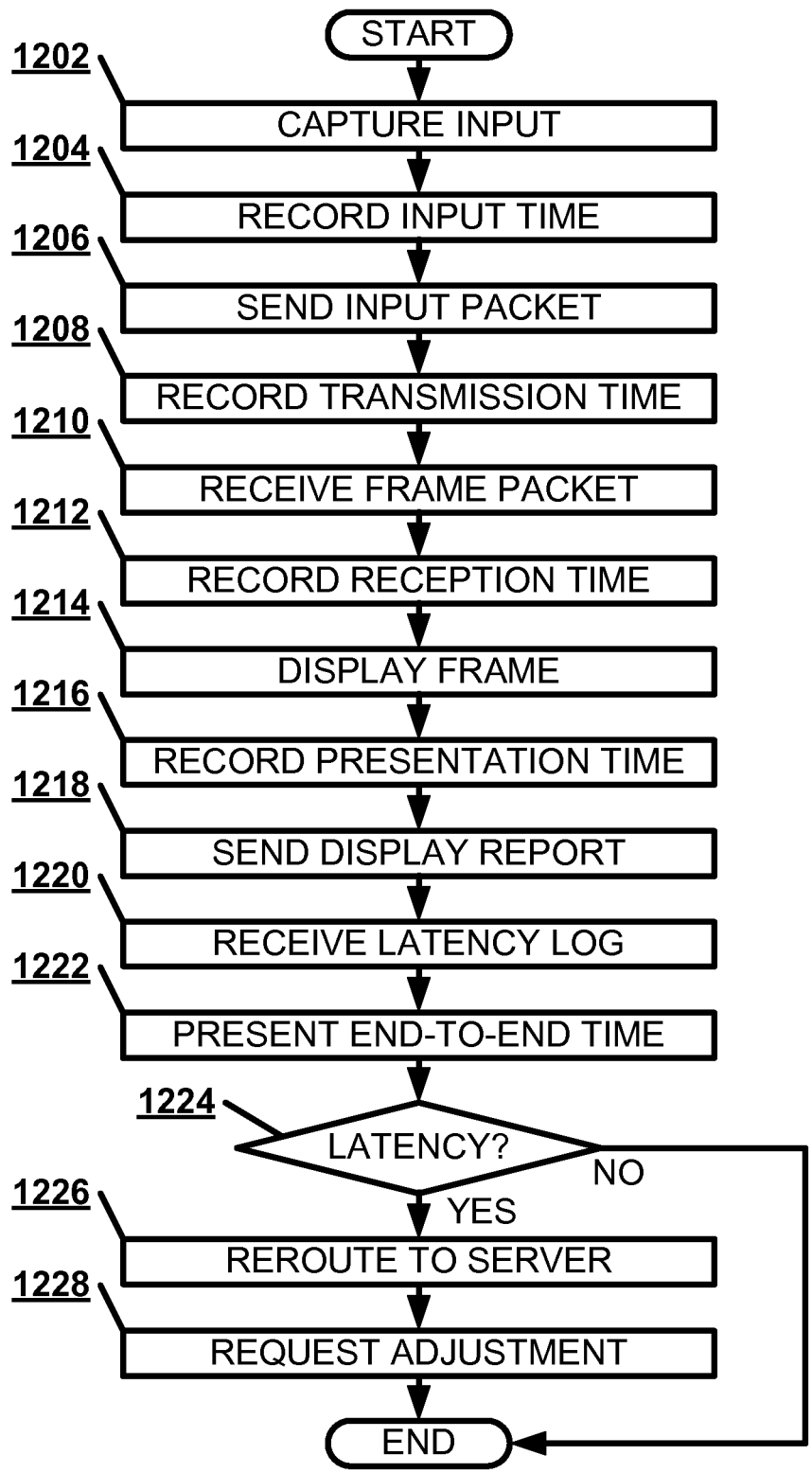
FIG. 12 illustrates, in a flowchart, one example of a method of receiving a latency log in a client device.

FIG. 12 illustrates, in a flowchart, one example of a method 1200 of receiving a latency log in a client device. The client device may capture a user input from a user (Block 1202). The client device may record the input time for the user input (Block 1204). The client device may send an input packet having the input identifier, the user input, and the input time to the streaming server (Block 1206). The client device may record a client transmission time identifying when the user input is transmitted to the streaming server (Block 1208). The client device may receive from the streaming server a frame packet having a frame output automatically correlated to the user input at the streaming server and a frame identifier for the frame output to identify the frame presentation time for the frame output (Block 1210). The client device may record a client reception time identifying when a frame output is received (Block 1212). The client device may display the frame output to the user (Block 1214). The client device may record a frame presentation time for the frame output (Block 1216). The client device may send a display report having at least one of input identifier, the frame identifier, the client transmission time, the client reception time, and the frame presentation time (Block 1218). The client device may receive from the streaming server a latency log describing the end-to-end time and other performance timing metrics (Block 1220). The client device may present the end-to-end time to the user (Block 1222). If the latency of the streaming operation is greater than a latency threshold (Block 1224), the client device may reroute to an alternate streaming server based on the end-to-end time to a user (Block 1226). The client device may request an adjustment of a refresh rate based on the end-to-end time (Block 1228)

Figure 13:
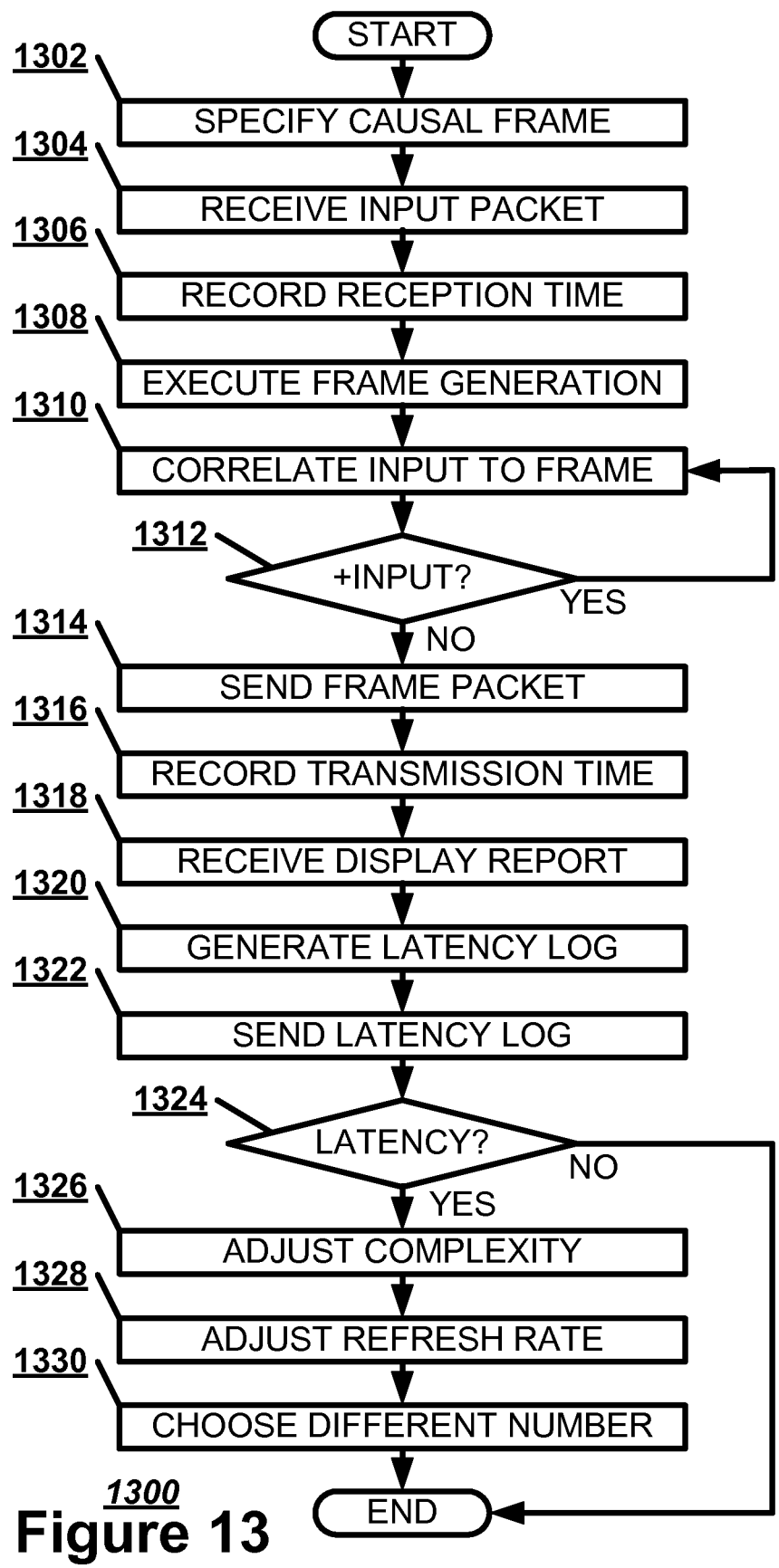
FIG. 13 illustrates, in a flowchart, one example of a method of sending a latency log from a streaming server.

FIG. 13 illustrates, in a flowchart, one example of a method 1300 of sending a latency log from a streaming server. The streaming server may specify a causal frame number indicating a frame quantity immediately after the user input to disregard as being causal (Block 1302). The streaming server may receive an input packet having a user input, an input identifier for the user input, and an input time for the user input from a client device (Block 1304). The streaming server may record a server reception time upon receiving the user input (Block 1306). The streaming server may execute a frame generation process to generate a frame output based on the user input (Block 1308). The streaming server may automatically correlating the user input to the frame output generated in a frame generation process (Block 1310). If the streaming server identifies an additional user input related to the frame output (Block 1312), the streaming server may automatically correlate the additional user input to the frame output (Block 1310).

The streaming server may send to the client device a frame packet having the correlated user input identifiers, a frame output, and a frame identifier for the frame output to identify the frame presentation time for the frame output (Block 1314). The streaming server may record a server transmission time upon sending the frame output to a client device (Block 1316). The streaming server may receive from the client device a display report having an input identifier for the user input, a frame identifier for the frame output, a frame presentation time for the frame output, a client transmission time identifying when the user input is transmitted from the client device to the streaming server, and a client reception time identifying when the frame output is received by the client device from the streaming server (Block 1318).

The streaming server may generate a latency log storing at least one of the input identifier, the input time, the frame identifier, the frame presentation time, and the end-to-end time (Block 1320). The streaming server may send the latency log having the end-to-end time to the client device for presentation to the user (Block 1322). If the latency of the streaming operation is greater than a latency threshold (Block 1324), the streaming server may adjust a rendering complexity for the frames based on the end-to-end time to a user (Block 1326). The streaming server may adjust a refresh rate for the frames based on the end-to-end time (Block 1328). The streaming server may choose a different causal frame number based on a latency accuracy of the end-to-end time (Block 1330).

Figure 14:
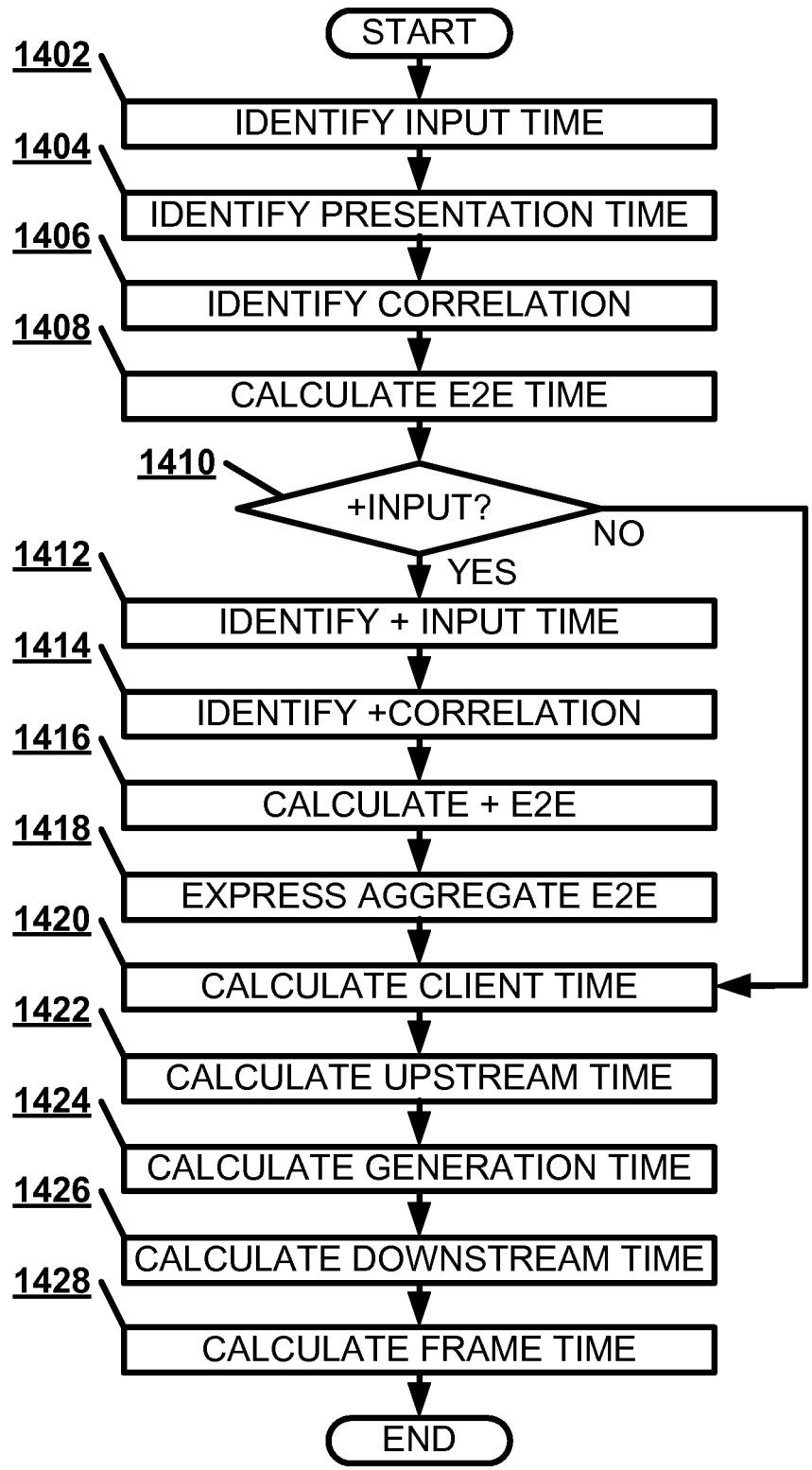
FIG. 14 illustrates, in a flowchart, one example of a method of generating timing metrics.

FIG. 14 illustrates, in a flowchart, one example of a method of generating timing metrics, either at the client device or at the streaming server. The client device or the streaming server may identify an input time for a user input (Block 1402). The client device or the streaming server may identify a frame presentation time for a frame output (Block 1404). The streaming server or the client device may identify a correlation by the streaming server of the frame output to the user input (Block 1406). The client device or the streaming server may calculate an end-to-end (E2E) time based on the input time and the frame presentation time (Block 1408). If an additional user input is correlated to the frame output (Block 1410), the client device or the streaming server may identify an additional input time for the additional user input (Block 1412). The streaming server or the client device may identify an additional correlation by the streaming server of the frame output to the additional user input (Block 1414). The client device or the streaming server may calculate an additional end-to-end time based on the additional input time and the frame presentation time of the frame output (Block 1416). The client device or the streaming server may express an aggregate input end-to-end time based on at least one of a minimum end-to-end time, a maximum end-to-end time, and an average end-to-end time over multiple user inputs (Block 1418).

The streaming server may make further calculations to determine component aspect metrics for the operation. The client device may also make these calculations, provided the proper data. The streaming server may calculate a client processing time based on the input time and a client transmission time (Block 1420). The streaming server may calculate an upstream transmission time based on a client transmission time and a server reception time (Block 1422). The streaming server may calculate a server frame generation time based on a server reception time and a server transmission time (Block 1424). The streaming server may calculate a downstream transmission time based on a server transmission time and a client reception time (Block 1426). The streaming server may calculate a client frame processing time based on a frame presentation time and a client reception time (Block 1428).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A streaming server, comprising:
memory configured to store an input time associated with a user input received in an input packet having an input identifier and a frame presentation time associated with a frame output having a frame identifier; and
a processing core having at least one processor configured to execute instructions stored in the memory to:
automatically correlate the input identifier associated with the user input to the frame identifier of the frame output generated at the streaming server in a frame generation process based on a probabilistic determination that the frame output was generated based on the user input, wherein the probabilistic determination is based on previous time trials of the frame generation process that generates the frame output based on the user input;
calculate an end-to-end time based on the input time that is associated with the input identifier and the frame presentation time that is associated with the frame identifier that is correlated with the input identifier; and adjust the frame generation process based on the end-to-end time.

2. The streaming server of claim 1, further comprising: a communication interface configured to send the end-to-end time to a client device for presentation to a user.

3. The streaming server of claim 1, wherein adjusting the frame generation process comprises adjusting a rendering complexity.

4. The streaming server of claim 1, wherein the at least one processor is configured to generate a latency log storing an input identifier, the input time, a frame identifier, the frame presentation time, and the end-to-end time.

5. The streaming server of claim 1, wherein the memory is configured to record at least one of a server reception time upon receiving the user input and a server transmission time upon sending the frame output from the streaming server to a client device.

6. The streaming server of claim 1, wherein the at least one processor is configured to calculate at least one of a client input processing time based on the input time and a client transmission time, an upstream transmission time based on a server reception time and the client transmission time, a server frame generation time based on the server reception time and a server transmission time, a downstream transmission time based on the server transmission time and a client reception time, and a client frame processing time based on the frame presentation time and the client reception time.

7. The streaming server of claim 1, wherein the at least one processor is configured to identify an additional input time for an additional user input, to automatically correlate the additional user input to the frame output generated at the streaming server in a frame generation process, and to calculate an additional end-to-end time based on the additional input time and the frame presentation time.

8. The streaming server of claim 1, wherein the at least one processor is further configured to express an aggregate input end-to-end time based on at least one of a minimum end-to-end time, a maximum end-to-end time, and an average end-to-end time over multiple user inputs.

9. The streaming server of claim 1, wherein the at least one processor is configured to automatically correlate the input identifier associated with the user input to the frame identifier of the frame output generated at the streaming server in a frame generation process by specifying a causal frame number indicating a frame quantity immediately after the user input to disregard as being causal based on the previous time trials.

10. The streaming server of claim 9, wherein the at least one processor is further configured to choose a different causal frame number based on the end to, end time.

11. A computing device, having a memory to store an input time associated with a user input transmitted in an input packet having an input identifier and a frame presentation time associated with a frame output having a frame identifier generated at a streaming server in a frame generation process, the computing device configured to execute instructions stored in the memory to:
receive the frame output from the streaming server;
identify a correlation by the streaming server of the frame identifier of the frame output to the input identifier associated with the user input based on a probabilistic determination that the frame output was generated based on the user input, wherein the probabilistic determination is based on previous time trials of the frame generation process that generates the frame output based on the user input;
calculate an end-to-end time based on the input time that is associated with the input identifier and the frame presentation time that is associated with the frame identifier that is correlated with the input identifier; and
present the end-to-end time to a user.

12. The computing device of claim 11, wherein the computing device is further configured to request an adjustment of a refresh rate based on the end-to-end time.

13. The computing device of claim 11, wherein the computing device is further configured to reroute to an alternate streaming server based on the end-to-end time.

14. The computing device of claim 11, wherein the computing device is further configured to generate latency log storing at least one of an input identifier, the input time, a frame identifier, the frame presentation time, and the end-to-end time.

15. The computing device of claim 11, wherein the computing device is further configured to record a client transmission time identifying, when the user input is transmitted to the streaming server and a client reception time identifying when a frame output is received.

16. The computing device of claim 11, wherein the computing device is further configured to:
identify an additional input time for an additional user input;
identify an additional correlation by the streaming server of the frame output to the additional user input; and
calculate an additional end-to-end time based on the additional input time and the frame presentation time of the frame output.

17. The computing device of claim 11, wherein the computing, device is further configured to express an aggregate input end-to-end time based on at least one of a minimum end-to-end time, a maximum end-to-end time, and an average, end-to-end time over multiple user inputs.

18. A machine-implemented method, comprising: receiving in, a streaming server a user input received in an input packet having an input identifier and an input time for the user input from a client device;
automatically correlating the input identifier associated with the user input to a frame identifier of a frame output generated at the streaming server in a frame generation process based on a probabilistic determination that the frame output was generated based on the user input, wherein the probabilistic determination is based on previous time trials of the frame generation process that generates the frame output based on the user input,
receiving in the streaming server a frame presentation time for the frame identifier of the frame output from the client device;
calculating at the streaming server an end-to-end time, based on the input time that is associated with the input identifier and the frame presentation time that is associated with the frame identifier that is correlated with the input identifier; and
sending the end-to-end time from the streaming server to the client device for presentation to a user.

19. The method of claim 18, further comprising: adjusting a based on the end-to-end time.

20. The method of claim 18, wherein automatically correlating the input identifier associated with the user input to a frame identifier of a frame output generated at the streaming server in a frame generation process comprises specifying a causal frame number indicating a frame quantity immediately after the user input to disregard as being causal based on the previous time trials.

\* \* \* \* \*